US012062324B2

(12) United States Patent
Kim et al.

(10) Patent No.: US 12,062,324 B2
(45) Date of Patent: Aug. 13, 2024

(54) CURRENT SUPPLY CIRCUIT AND DISPLAY DEVICE INCLUDING THE SAME

(71) Applicant: LX Semicon Co., Ltd., Daejeon (KR)

(72) Inventors: Ji Hwan Kim, Daejeon (KR); Sang Suk Kim, Daejeon (KR); Jang Su Kim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 2 days.

(21) Appl. No.: 17/960,690

(22) Filed: Oct. 5, 2022

(65) Prior Publication Data

US 2023/0148364 A1 May 11, 2023

(30) Foreign Application Priority Data

Nov. 5, 2021 (KR) ........................ 10-2021-0151131

(51) Int. Cl.
*G09G 3/32* (2016.01)

(52) U.S. Cl.
CPC ....... *G09G 3/32* (2013.01); *G09G 2300/0833* (2013.01); *G09G 2310/0272* (2013.01); *G09G 2310/08* (2013.01)

(58) Field of Classification Search
CPC ............. G09G 3/32; G09G 2310/0272; G09G 2310/08; G09G 2300/0833
See application file for complete search history.

(56) References Cited

U.S. PATENT DOCUMENTS

| | | | | |
|---|---|---|---|---|
| 9,223,334 | B2 * | 12/2015 | Noda ..................... | H05B 47/10 |
| 9,588,541 | B1 | 3/2017 | Ho et al. | |
| 2003/0020519 | A1 | 1/2003 | Leung et al. | |
| 2005/0145891 | A1 * | 7/2005 | Abe ..................... | G09G 3/3241 257/288 |
| 2006/0202763 | A1 * | 9/2006 | Niki .................... | H03F 3/45183 330/288 |
| 2009/0230998 | A1 * | 9/2009 | Hayashi ................... | G09G 3/32 327/109 |

* cited by examiner

*Primary Examiner* — Priyank J Shah
(74) *Attorney, Agent, or Firm* — ROTHWELL, FIGG, ERNST & MANBECK, P.C.

(57) ABSTRACT

A current mirror circuit includes a first transistor configured to be supplied with a data current from a data driving circuit; a second transistor configured to drive a light emitting diode by mirroring the data current transferred to the first transistor; and a voltage compensation circuit disposed between one terminal of the first transistor and one terminal of the second transistor and configured to compensate for a difference between voltages of the one terminals of the first transistor and the second transistor.

15 Claims, 12 Drawing Sheets

1000

CURRENT SUPPLY CIRCUIT AND DISPLAY DEVICE INCLUDING THE SAME

CROSS REFERENCE TO RELATED APPLICATION

This application claims priority to Republic of Korea Patent Application No. 10-2021-0151131 filed on Nov. 5, 2021, which is hereby incorporated by reference in its entirety.

BACKGROUND

1. Field of Technology

The present disclosure relates to a current supply circuit and a display device including the same.

2. Related Technology

A display device includes a data driving circuit, a gate driving circuit, and so forth for driving pixels disposed in a panel.

The data driving circuit determines a data voltage or a data current according to image data, and supplies the data voltage or the data current to a pixel of the panel through a data line to control the brightness of the pixel.

Even though the same data voltage is supplied from the data driving circuit, the brightness of each pixel may vary depending on the characteristics of each pixel or an external environment. For example, each pixel includes a driving transistor. If the threshold voltage of the driving transistor varies, the brightness of the pixel may vary even though the same data voltage is supplied. If the data driving circuit does not consider such variations in the characteristics of the pixels, problems may be caused in that the pixels are driven to undesired brightness and image quality deteriorates.

In addition, even though the same data voltage is supplied from the data driving circuit, if a current or a voltage of a terminal of the driving transistor is changed or the current or the voltage is not mirrored as an identical current or voltage in a current mirror circuit, the brightness of the pixel may vary. For example, an additional component for reducing a change in the voltage of the driving transistor, such as a capacitor, may be further included in order to prevent deterioration of the image quality of the pixel, but there may arise a problem in that the desired brightness of pixels is not realized due to a voltage difference or a current difference between the capacitor and transistors around the pixel due to external or internal causes, for example, differences between drain voltages of respective transistors of a current mirror circuit, a current difference between channels, a current difference between ICs, etc.

The discussions in this section are only to provide background information and does not constitute an admission of prior art.

SUMMARY

Under such a background, an aspect of the present disclosure is to provide a current supply circuit capable of maintaining voltages of source terminals or drain terminals of respective transistors to be uniform in a current mirror circuit of a display device.

Another aspect of the present disclosure is to provide a current supply circuit in which a plurality of switches are disposed in a path through which a current is transferred from a data driving circuit to a pixel and the operations of the respective switches are correlated to be capable of electrically disconnecting each component of a current mirror circuit depending on a time period.

Still another aspect of the present disclosure is to maintain a current inputted to the current mirror circuit and an output current from the current mirror circuit to have the same level by maintaining voltages, at one terminals of transistors forming a current mirror circuit, to be uniform or to add a circuit for minimizing a current difference.

In one aspect, an embodiment may provide a current mirror circuit including: a first transistor configured to be supplied with a data current from a data driving circuit; a second transistor configured to drive a light emitting diode by mirroring the data current transferred to the first transistor; and a voltage compensation circuit disposed between a drain terminal of the first transistor and a drain terminal of the second transistor, and configured to compensate for a difference between drain voltages of the first transistor and the second transistor.

In another aspect, an embodiment may provide a current supply circuit including: a current mirror circuit configured to generate an output current by mirroring an input current through a pair of transistors; and a voltage compensation circuit configured to compensate for a voltage difference between an input signal line to which the input current is transferred and an output signal line to which the output current is transferred.

In still another aspect, an embodiment may provide a current supply circuit including: a first transistor selectively supplied with a data driving current through a data current cutoff switch from a data line; a second transistor configured to supply a current having a magnitude corresponding to the data driving current transferred to the first transistor, to a light emitting diode; a third transistor connected to gate terminals of the first transistor and the second transistor, and configured to electrically isolate the first transistor and the second transistor by cutting off current supply when the data current cutoff switch is turned off; and a voltage compensation circuit connected to one ends of the first transistor and the second transistor, and configured to compensate a voltage of the gate terminal of the second transistor, wherein an operation of the voltage compensation circuit is changed in correspondence to operating timing of the data current cutoff switch.

As is apparent from the above, according to the embodiments, voltages of source terminals or drain terminals of respective transistors of a current mirror circuit may be maintained to be uniform and a change in the voltage in a display device may be minimized. This may lead to maintaining the uniform brightness of pixels so that the deterioration of image quality may be prevented.

Further, according to the embodiments, since the operations of a plurality of transistors of a pixel may be correlated to electrically disconnect or connect an internal circuit, unnecessary power consumption may be prevented, and power efficiency during the operation process of a panel may be improved.

Moreover, according to the embodiments, by compensating for or uniformly maintaining a voltage difference between terminals of transistors of a current mirror circuit, the deviation between an input current and an output current of the current mirror circuit may be reduced and the brightness of pixels may be uniformly maintained.

DETAILED DESCRIPTION OF EMBODIMENTS

Figure 1:
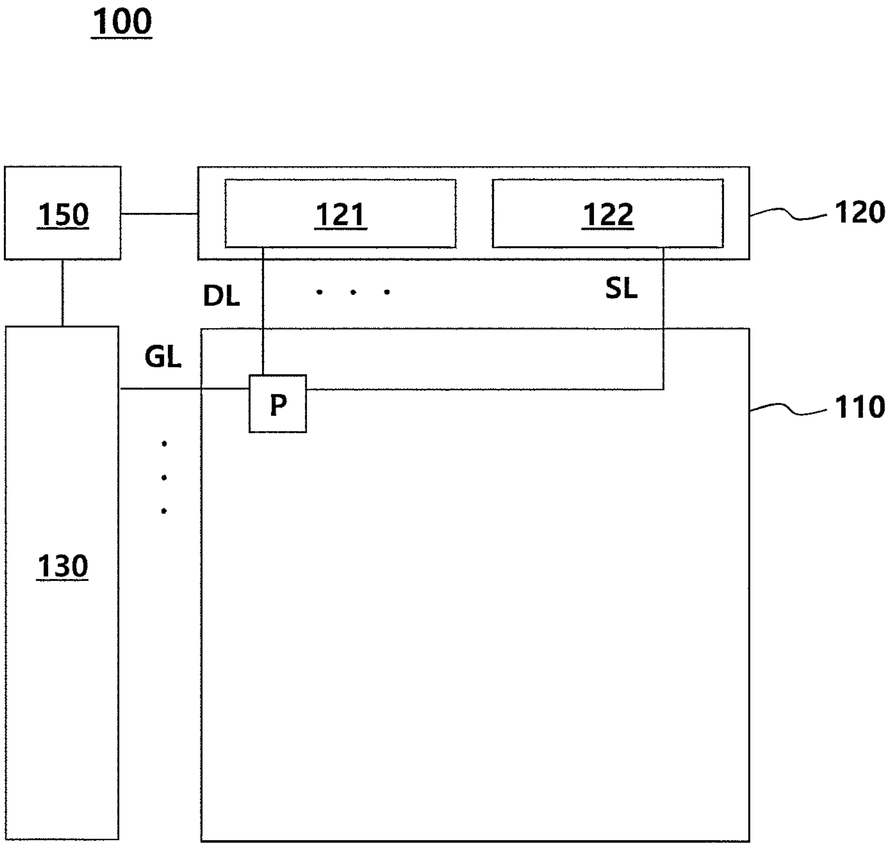
FIG. 1 is a diagram illustrating the configuration of a display device in accordance with an embodiment of the present disclosure.

FIG. 1 is a diagram illustrating the configuration of a display device in accordance with an embodiment of the present disclosure.

Referring to FIG. 1, a display device 100 may include a panel 110, a data driving circuit 120, a gate driving circuit 130, a data processing circuit 150, and so forth.

In the panel 110, a plurality of data lines DL, a plurality of gate lines GL and a plurality of sensing lines SL may be disposed, and a plurality of pixels P may be disposed.

The panel 110 may be a panel in which one or more of a display panel (not illustrated) and a touch panel (not illustrated) are formed separately or integrally. As the panel 110, various panels such as a liquid crystal display (LCD), an organic light emitting diode (OLED), a light emitting diode (LED) and a mini-LED may be used without a limiting sense.

Each of the pixels P disposed in the panel 110 may include at least one light emitting diode (LED) and at least one transistor. The characteristics of the LED and the transistor included in each pixel P may vary over time or depending on a surrounding environment.

The data driving circuit 120 may supply a data voltage to the pixel P through the data line DL. The data voltage supplied to the data line DL may be transferred to the pixel P connected to the data line DL according to a scan signal of the gate driving circuit 130. If necessary, the data driving circuit 120 may be defined as a source driver.

The data driving circuit 120 may include a data signal transmission circuit 121 and a pixel sensing circuit 122.

The data signal transmission circuit 121 may transfer an analog signal to the pixel P in the form of a voltage or a current.

The data signal transmission circuit 121 may include a voltage/current converter (not illustrated), and may supply a data voltage or a data current to the light emitting diode (LED) of the pixel P.

The pixel sensing circuit 122 may receive an analog signal (e.g., a voltage, a current, etc.), formed in each pixel P, through the sensing line SL, and may determine the characteristics of the pixel P. The pixel sensing circuit 122 may sense a change in the characteristics of each pixel P according to time, and may transmit a signal to the data processing circuit 150.

The pixel sensing circuit 122 may include an analog front end (AFE), a sample and hold (S/H), an amplifier (AMP) and an analog-to-digital converter (ADC).

The analog front end (not illustrated) may sense the pixel P, and may process a current transferred from the pixel P to form a sensing voltage Vi.

The sample and hold (not illustrated) may signally separate the analog front end and the amplifier, may temporarily store the sensing voltage (Vi) outputted from the analog front end, and then, may input the sensing voltage (Vi) or a difference (ΔVi) between the sensing voltage (Vi) and a reference voltage to the amplifier.

The amplifier (not illustrated) may amplify the sensing voltage (Vi) or the difference (ΔVi) between the sensing voltage (Vi) and the reference voltage transferred to the input terminal thereof, and may transfer the amplified sensing voltage (Vi) or the amplified difference (ΔVi) to the analog-to-digital converter.

The analog-to-digital converter (not illustrated) may convert the output voltage of the amplifier into a digital signal (Ao).

The gate driving circuit 130 may supply a scan signal of a turn-on voltage or a turn-off voltage to the gate line GL. When the scan signal of the turn-on voltage is supplied to the pixel P, the corresponding pixel P is connected to the data line DL, and when the scan signal of the turn-off voltage is supplied to the pixel P, the connection between the corresponding pixel P and the data line DL is released. If necessary, the gate driving circuit 130 may be defined as a gate driver. The scan signal of the gate driving circuit 130 may define the turn-on timing or turn-off timing of the transistor of the pixel P.

The data processing circuit 150 may supply various control signals to the data driving circuit 120 and the gate driving circuit 130. The data processing circuit 150 may transmit a data control signal (DCS) which controls the data driving circuit 120 to supply a data voltage to each pixel P or transmit a gate control signal (GCS) to the gate driving circuit 130, in conformity with each timing. If necessary, the data processing circuit 150 may be defined as a timing controller (T-Con).

The data processing circuit 150 may output image data RGB converted from externally inputted image data in conformity with a data signal format used in the data driving circuit 120 to transfer the image data RGB to the data driving circuit 120.

Figure 2:
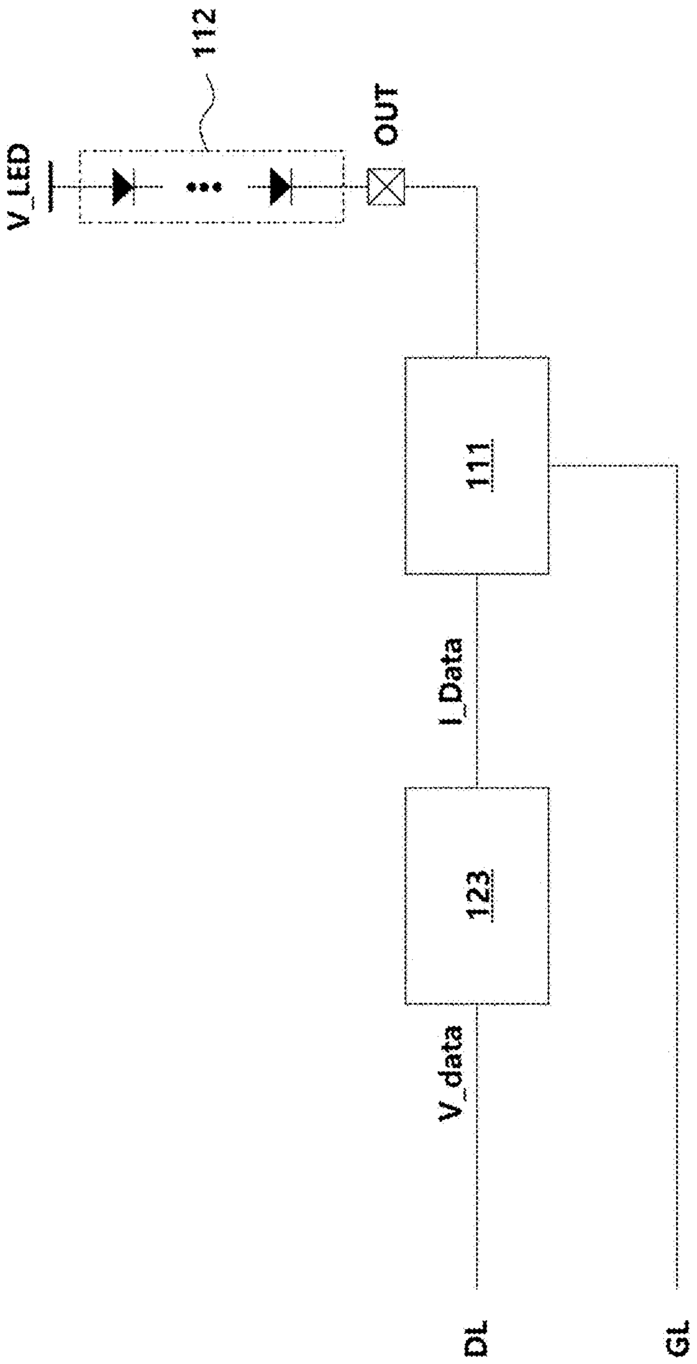
FIG. 2 is a diagram illustrating a signal flow of a current supply circuit in accordance with an embodiment of the present disclosure.

FIG. 2 is a diagram illustrating a signal flow of a current supply circuit in accordance with an embodiment of the present disclosure.

Figure 3:
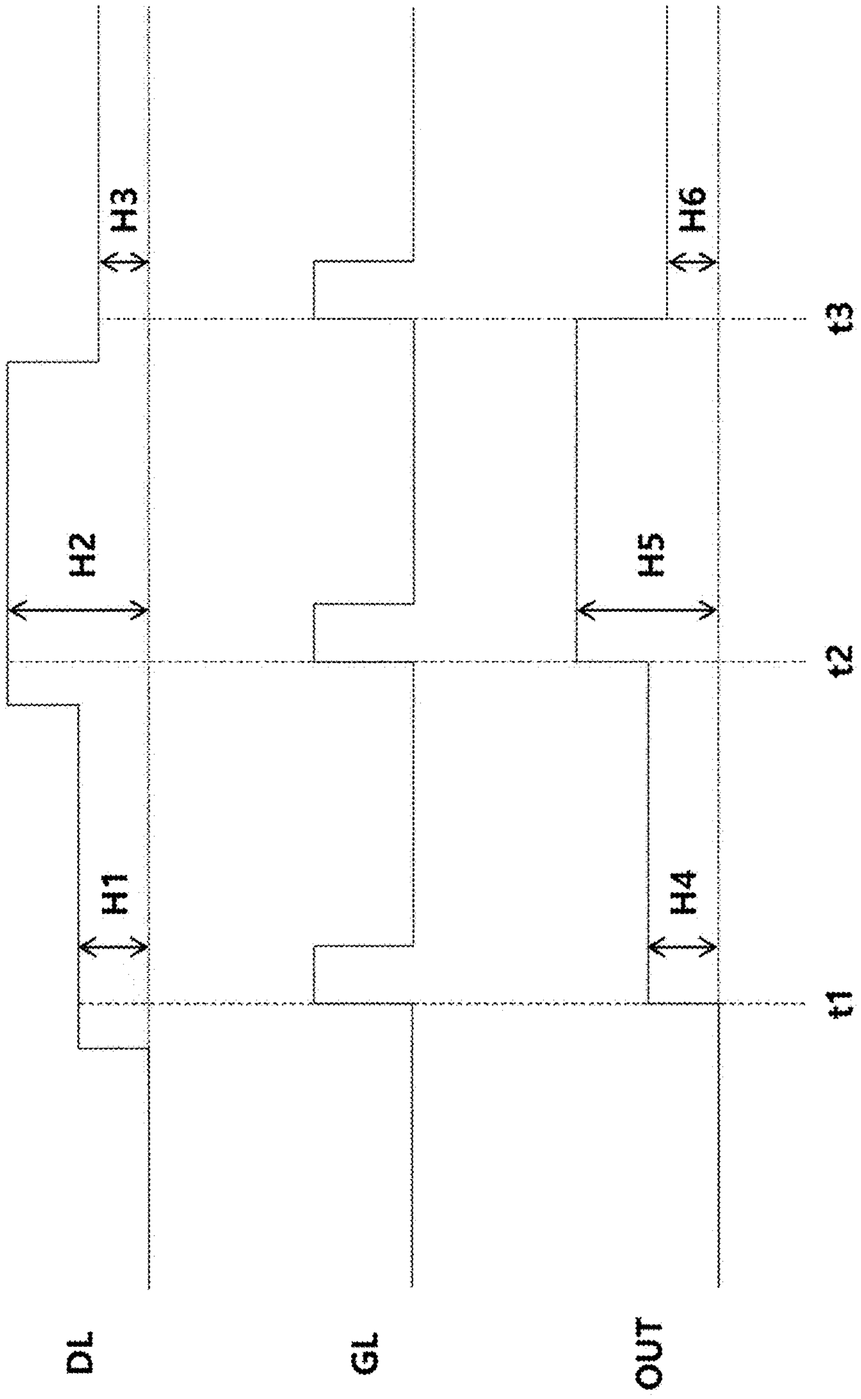
FIG. 3 is a diagram illustrating signal timing of the current supply circuit in accordance with the embodiment of the present disclosure.

FIG. 3 is a diagram illustrating signal timing of the current supply circuit in accordance with the embodiment of the present disclosure.

Referring to FIGS. 2 and 3, the signal flow of a current supply circuit 111 may be defined by a data voltage V_data transferred through a data line DL and a scan signal transferred through a gate line GL.

The current supply circuit 111 may receive the data voltage V_data from the data driving circuit 120 (see FIG. 1) or may receive a data current I_data which is converted by a voltage-current converter 123.

The voltage/current converter 123 may be omitted depending on the type of an analog signal transferred from the data driving circuit 120. For example, when the signal transferred from the data driving circuit 120 is the data current I_data, the voltage-current converter 123 may be omitted, and the data current I_data may be directly transferred to the current supply circuit 111.

The current supply circuit 111 may receive the scan signal from the gate driving circuit 130 (see FIG. 1), and may transfer a corresponding output voltage or output current to a light emitting diode 112 at corresponding timing.

The output voltage or output current of the current supply circuit 111 may correspond to the magnitude of the data voltage V_data or the data current I_data. For example, the current supply circuit 111 may be a current mirror circuit (not illustrated), and in this case, may transfer a voltage or a current the same as the magnitude of the data voltage V_data or the data current I_data to the light emitting diode 112.

The magnitude of the current transferred to the light emitting diode 112 may be defined according to the voltage of an output end OUT of the current supply circuit 111 and a voltage V LED of one end of the light emitting diode 112. Also, the magnitude of the current transferred to the light emitting diode 112 may be defined according to the state of a transistor which is connected to the output end OUT of the current supply circuit 111.

Referring to FIG. 3, timing of an input signal and an output signal of the current supply circuit 111 may be compared.

The data voltage V_data or the data current I_data may be supplied to the current supply circuit 111 through the data line DL, and the scan signal may be supplied through the gate line GL.

The signal of the output end OUT of the current supply circuit 111 may be generated as an output voltage in correspondence to pulse timing t1, t2 and t3 of the scan signal of the gate line GL.

The signal of the output end OUT of the current supply circuit 111 may be a signal which is outputted by mirroring the data voltage V_data or the data current I_data transferred to the data line DL. In this case, the current supply circuit 111 may be a current mirror circuit in which a plurality of transistors are coupled, but is not limited thereto.

Magnitudes H4, H5 and H6 of the signals of the output end OUT of the current supply circuit 111 may be the same as magnitudes H1, H2 and H3 of the data voltage V_data or the data current I_data, and may be defined to have a correspondence relationship of preset correlation or a multiple signal magnitude ratio.

The input signal and output signal of the current supply circuit 111 exemplify the magnitude and waveform of each signal, and are not limited to FIG. 3.

The current supply circuit 111 may further include a voltage compensation circuit (not shown) in order to maintain a desired ratio between an input signal and an output signal.

Figure 4:
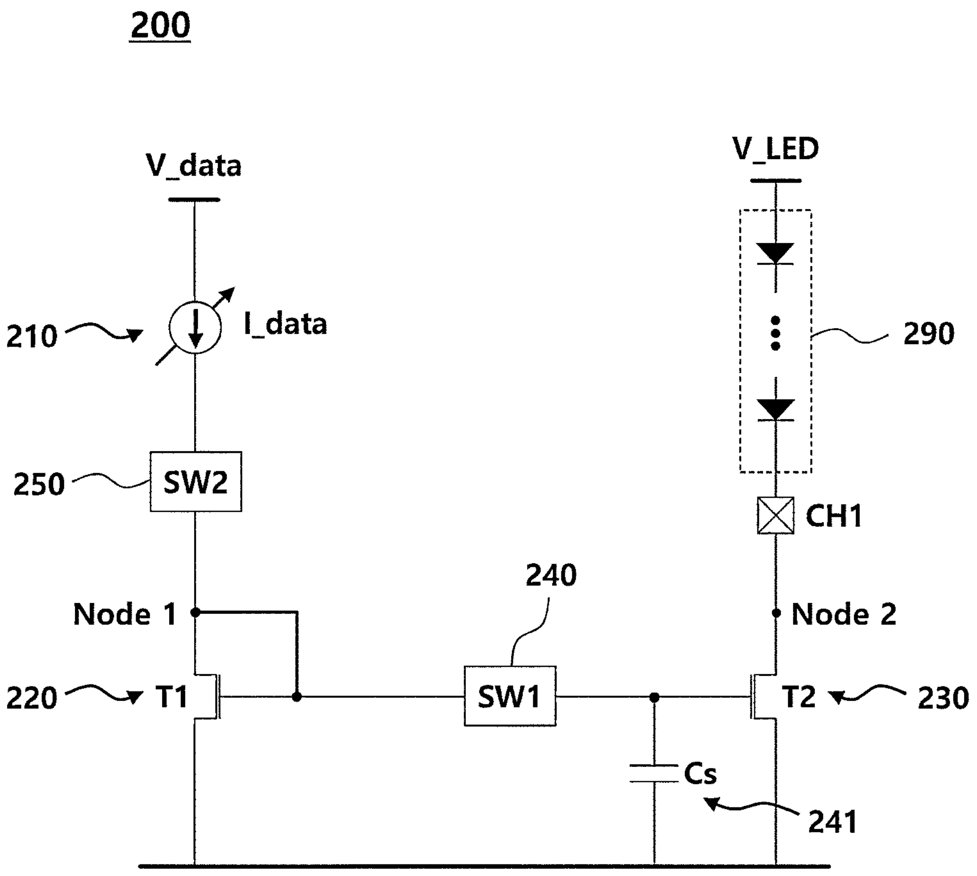
FIG. 4 is a first exemplary diagram illustrating a current supply circuit in accordance with an embodiment of the present disclosure.

FIG. 4 is a first exemplary diagram illustrating a current supply circuit in accordance with an embodiment of the present disclosure.

Referring to FIG. 4, a current supply circuit 200 may include a first transistor 220, a second transistor 230, a first switch 240, a capacitor 241, a second switch 250, and so forth.

The first transistor 220 may be supplied with a data voltage V_data or a data current I_data from a data driving circuit (not shown) through a data line DL.

A voltage/current converter 210 may be disposed between the data driving circuit (not shown) and the first transistor 220 to convert the data voltage V_data into the data current I_data. However, when the type of the signal transferred from the data driving circuit (not shown) is the data current I_data, the voltage/current converter 210 may be omitted.

The second transistor 230 may receive a signal transferred from the first transistor 220 and supply a current to a light emitting diode 290. The light emitting diode 290 may be an individual element, but may be a plurality of elements which are configured as one channel CH1. Also, the light emitting diode 290 may form a panel by including a plurality of channels.

The second transistor 230 may mirror the data current I_data transferred to the first transistor 220 and transfer the data current I_data to the light emitting diode 290. A circuit including the first transistor 220 and the second transistor 230 may be defined as a current mirror circuit (not shown).

The first switch 240 may be disposed between the first transistor 220 and the second transistor 230 and may adjust the input current or the input voltage of a gate terminal of the second transistor 230. The first switch 240 may be a switch which cuts off or passes a current by short-circuiting or opening a signal line, and may be a switch transistor which adjusts the intensity of a current.

The second switch 250 may be disposed between the data driving circuit (not shown) and the first transistor 220, and may adjust a current passing through the data line DL. The second switch 250 may be a switch which cuts off or passes a current by short-circuiting or opening a signal line, and may be a switch transistor which adjusts the intensity of a current.

The entire or partial configuration of the second switch 250 may be defined as a data current cutoff switch (not shown) for cutting off or limiting a data current.

Operations of entire or partial configurations of the first switch 240 and the second switch 250 may be performed by being correlated with each other. The operations of the first switch 240 and the second switch 250 may be performed by being correlated with each other such that the second switch 250 is turned off during a turn-off period of the first switch 240 or is turned on during a turn-on period of the first switch 240.

The first switch 240 may keep supplying a current to the second transistor 230 when the second switch 250 is turned on and, when the second switch 250 is turned off, may stop supplying the current so that the first transistor 220 is electrically disconnected from the second transistor 230.

The second switch 250 may be omitted from the current supply circuit 200 and only the first switch 240 may operate to adjust a current or a voltage for a pixel supplied to a second node (node 2).

The capacitor 241 may be disposed between the first transistor 220 and the second transistor 230 to store the voltage of the gate terminal of the second transistor 230. Since the voltage of the gate terminal of the second transistor 230, to which the capacitor 241 is not connected, is sensitively affected by an external change such as an external situation, a state of a pixel, etc., the capacitor 241 may store the voltage of the gate terminal of the second transistor 230 for a stable operation of a pixel.

The charging voltage of the capacitor 241 may be adjusted according to the operation of the first switch 220 or the second switch 230, and may maintain the same voltage during a preset time period.

In order to prevent a leakage current occurring in the capacitor 241, the first switch 240 existing at a position adjacent to the capacitor 241 may be changed in the terminal connection relationship of a transistor or the disposition of a transistor.

Optional one ends of the first transistor 220, the second transistor 230 and the capacitor 241 may be supplied with the same voltage, for example, a ground voltage, but are not limited thereto. In this case, as the one ends of the respective circuits 220, 230 and 241 are supplied with the same voltage, a reference point for signal transfer may be set.

The data voltage V_data may be a power supply voltage Vcc which is supplied to the current supply circuit 200.

Figure 5:
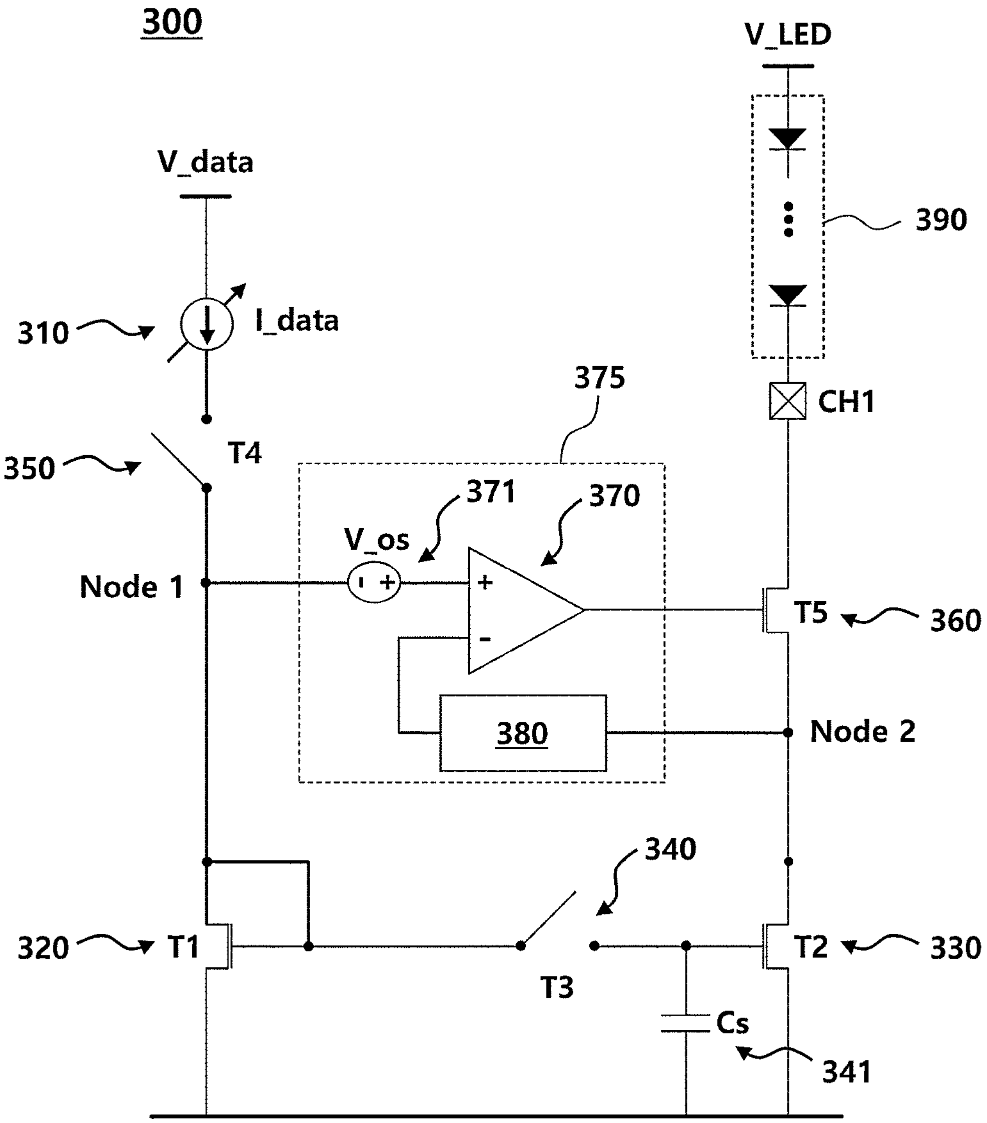
FIG. 5 is a second exemplary diagram illustrating a current supply circuit in accordance with an embodiment of the present disclosure.

FIG. 5 is a second exemplary diagram illustrating a current supply circuit in accordance with an embodiment of the present disclosure.

Referring to FIG. 5, a current supply circuit 300 may include a first transistor 320, a second transistor 330, a third transistor 340, a capacitor 341, a fourth transistor 350, a fifth transistor 360, an amplifier 370, an offset voltage compensation circuit 380, and so forth, and may realize the same or a similar function as or to the current supply circuit of FIG. 4 described above.

The first transistor 320 may be supplied with a data current or a data voltage from a data driving circuit.

The second transistor 330 may mirror a current of a magnitude corresponding to that of a data driving current I_data transferred to the first transistor 320 and may supply the current to a light emitting diode 390. Here, the first transistor 320 and the second transistor 330 may be considered as a pair of transistors forming a current mirror circuit (not shown).

The third transistor 340 may be one switch or switch transistor or may be defined as a circuit group including the same.

The third transistor 340 may be disposed between the first transistor 320 and the second transistor 330, and may adjust an input current to be transferred to the second transistor 330. For example, the third transistor 340 may be connected to a gate terminal of the first transistor 320 and a gate terminal of the second transistor 330 to selectively cut off a current to be transferred to the second transistor 320.

The operation of the third transistor 340 may be controlled by a data processing circuit (not shown) or a setting value of a register (not shown) of the current supply circuit 300.

The fourth transistor 350 may adjust a current to be transferred to a drain terminal of the first transistor 320.

The fourth transistor 350 may be turned on or off in response to the operation of the third transistor 340. For example, the fourth transistor 350 may be turned off during the turn-off period of all or some circuits of the third transistor 340. The fourth transistor 350, which adjusts the magnitude of or cuts off a data current, may be defined as a data current cutoff switch.

In addition, the fourth transistor 350 may be controlled independently of the operation of the third transistor 340. In the figure, the fourth transistor 350 may represent a circuit comprising the fourth transistor 350 and other circuits. As necessary, the fourth transistor 350 may be omitted from the current supply circuit 300 and a group of circuits performing a similar function may replace the fourth transistor 350.

The fifth transistor 360 may be a circuit which adjusts a current to be transferred to the light emitting diode 390, may receive the output voltage of the amplifier 370 as a gate voltage, and may adjust a voltage to be transferred to the light emitting diode 390 according to the drain voltage of the second transistor 330 to define the brightness of a pixel.

A voltage compensation circuit 375 may be disposed between the drain terminal of the first transistor 320 and a drain terminal of the second transistor 330 to compensate for the difference between the drain voltages of the first transistor 320 and the second transistor 330. When a drain terminal of the fifth transistor 360 is connected to a source or drain terminal of the second transistor 330, the voltage compensation circuit 375 may compensate for a difference in the drain voltage of the second transistor 330 by being connected to a gate terminal of the fifth transistor 360.

The voltage compensation circuit 375 may include the amplifier 370, the offset voltage compensation circuit 380, etc.

The amplifier 370 may be disposed between a source terminal or the drain terminal of the first transistor 320 and a source terminal or the drain terminal of the second transistor 330 or between the drain terminal of the first transistor 320 and the gate terminal of the fifth transistor 360. In such a configuration, it may be considered that the transistors are electrically connected.

An input terminal, for example, a positive input terminal, of the amplifier 370 may form a common node, for example, a first node (node 1), with the first transistor 320, and may receive a signal having the same waveform, magnitude and timing as a signal transferred to the first transistor 320.

An offset voltage (V_os) 371 in the amplifier 370 may be denoted in the form of a separate power supply, and the current supply circuit 300 may further include the offset voltage compensation circuit 380 which is connected to an input terminal of the amplifier 370 to remove or compensate for such an offset voltage (V_os) 371.

One terminal of the offset voltage compensation circuit 380 may be connected to the input terminal, for example, a negative input terminal, of the amplifier 370, and the other terminal of the offset voltage compensation circuit 380 may be connected to a common node, for example, a second node, which is formed by source or drain terminals of the second transistor 330 and the fifth transistor 360.

The offset voltage compensation circuit 380 may periodically remove the offset voltage 371 of the amplifier 370 during the operation of a panel, and thus, may control a current to be transferred to the light emitting diode 390 regardless of a variation in the surrounding environment, such as a temperature. Here, periodically removing the offset voltage may mean regularly removing an offset voltage in every frame or irregularly removing an offset voltage in a case of an occurrence of an offset voltage exceeding a reference value.

The amplifier 370 and the offset voltage compensation circuit 380 may be disposed between the first node and the second node to improve the accuracy of a current mirror, and may precisely control a current flowing through the light emitting diode 390 to realize the uniform image quality of the panel.

Figure 6:
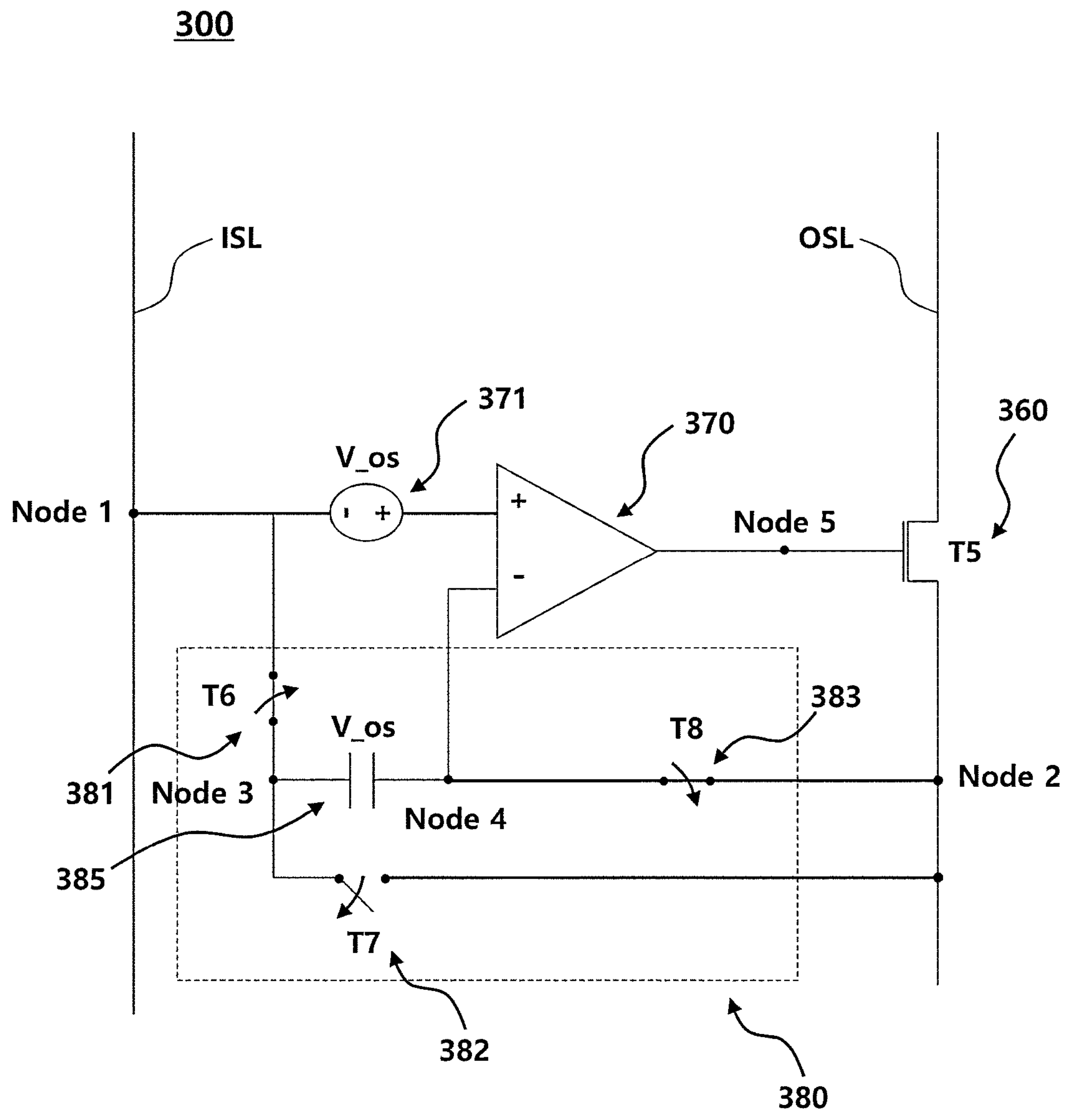
FIG. 6 is a first exemplary diagram illustrating a switching operation of the current supply circuit in accordance with the embodiment of the present disclosure during a first time period.

FIG. 6 is a first exemplary diagram illustrating a switching operation of the current supply circuit in accordance with the embodiment of the present disclosure during a first time period.

Figure 7:
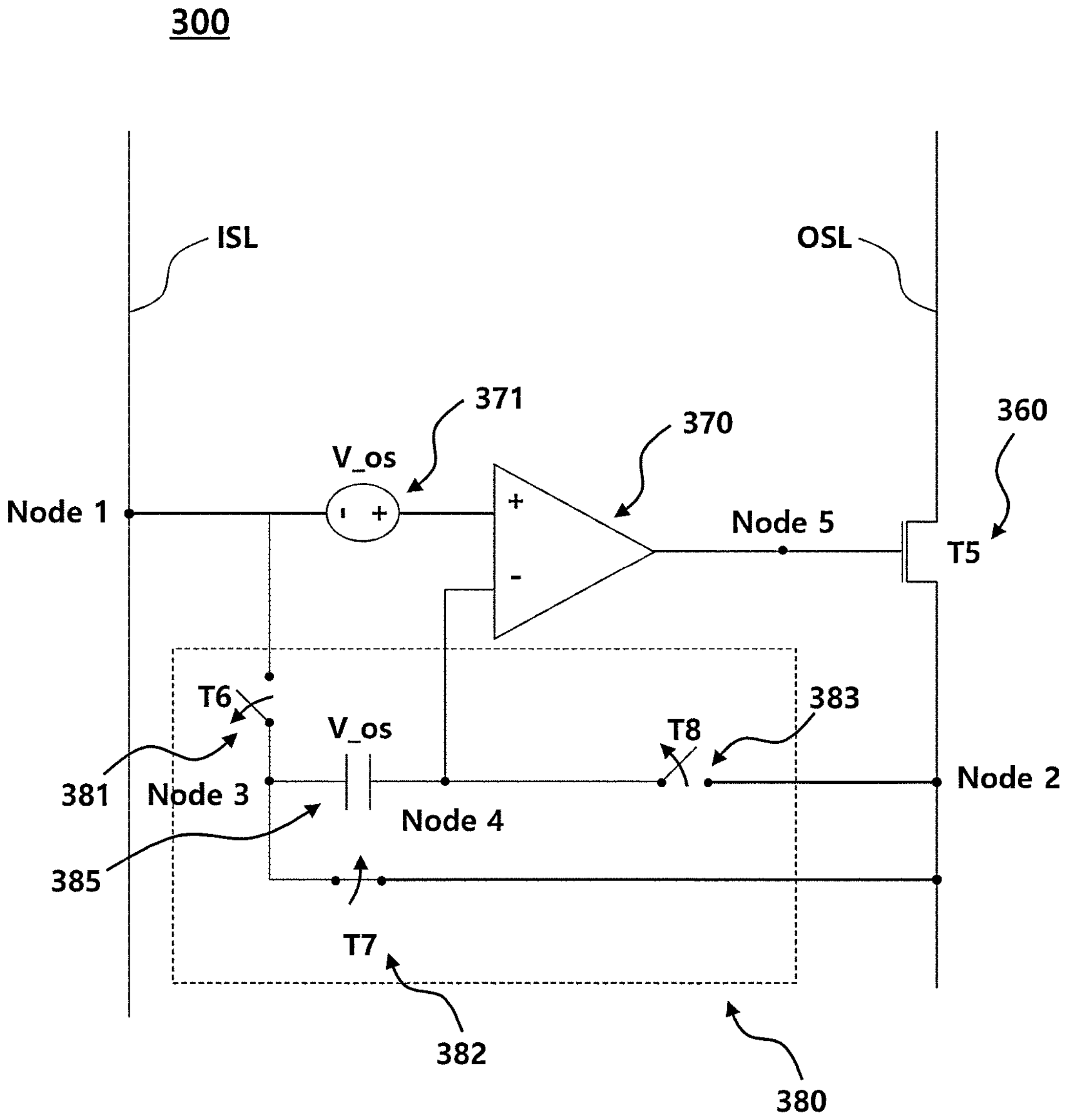
FIG. 7 is a first exemplary diagram illustrating a switching operation of the current supply circuit in accordance with the embodiment of the present disclosure during a second time period.

FIG. 7 is a first exemplary diagram illustrating a switching operation of the current supply circuit in accordance with the embodiment of the present disclosure during a second time period.

Referring to FIGS. 6 and 7, an enlarged diagram of the current supply circuit 300 of FIG. 5 is illustrated as a diagram for explaining the connection relationship of the respective components 360, 370 and 380 and an operation change during each time period.

The voltage compensation circuit 375 may connect a first input terminal, for example, the positive input terminal, of the amplifier 370 to the first node, and may connect a second input terminal, for example, the negative input terminal, of the amplifier 370 to the offset voltage compensation circuit 380.

The voltage compensation circuit 375 may connect an output terminal of the amplifier 370 to the source terminal or the drain terminal of the second transistor 330 through the second node or to the gate terminal of the fifth transistor 360 through a fifth node (node 5) to compensate for the offset voltage of the amplifier 370.

The offset voltage compensation circuit 380 may include a sixth transistor 381, a seventh transistor 382, an eighth transistor 383, an offset voltage compensation capacitor 385, and so forth.

The sixth transistor 381 may receive an input signal through the first node which is connected to the source terminal or the drain terminal of the first transistor 320. Also, the sixth transistor 381 may be connected to one terminal of the power source of the offset voltage of the amplifier 370.

The seventh transistor 382 may be connected to a common node, for example, a third node (node 3), which is formed by an output terminal of the sixth transistor 381 and one terminal of the offset voltage compensation capacitor 385. Also, the seventh transistor 382 may be connected to a node, for example, the second node, which is connected to the source terminal or the drain terminal of the second transistor 330.

The seventh transistor 382 may change the electrical connection of the second node and the third node through its switching operation, and therefore, may change the direction or magnitude of a current or a voltage to be transferred to the second node.

The eighth transistor 383 may be connected to a common node, for example, a fourth node (node 4), which is formed by the second input terminal, for example, the negative input terminal, of the amplifier 370 and the other terminal of the offset voltage compensation capacitor 385. Also, the eighth transistor 383 may be connected to the node which is connected to the source terminal or the drain terminal of the second transistor 330, for example, the second node.

The eighth transistor 383 may change the electrical connection between the second node and the fourth node, and thereby, may change the direction or magnitude of a current or voltage to be transferred to the second node.

The offset voltage compensation capacitor 385 may be connected to a node which is connected to the output terminal of the sixth transistor 381, for example, the third node, and a node which is connected to the second input terminal of the amplifier 370, for example, the fourth node.

The offset voltage compensation capacitor 385 may store a voltage having the same magnitude as the offset voltage (V_os) 371 in the amplifier 370 in order to remove the offset voltage (V_os) 371 and may remove the offset voltage (V_os) 371 in the amplifier 370 by the switching operations of the sixth to eighth transistors 381, 382 and 383 during each time period.

For example, during a first time period, the sixth transistor 381 and the eighth transistor 383 may be turned on at the same timing, and the seventh transistor 382 may be turned off. Further, during a second time period, the sixth transistor 381 and the eighth transistor 383 may be turned off at the same timing, and the seventh transistor 382 may be turned on.

The first time period may be defined as an offset sampling time period, and in this case, a voltage having the same magnitude as the offset voltage present in the amplifier 370 may be stored in the offset voltage compensation capacitor 385. In this case, a voltage formed at the second node may be the sum of a voltage formed at the first node and the offset voltage V_os of the amplifier 370.

The second time period may be defined as an offset compensation time period, and in this case, the offset voltage V_os may be removed or compensated for by the voltage stored in the offset voltage compensation capacitor 385 by reversely changing the connection relationship of the respective terminals of the offset voltage compensation capacitor 385. In this case, a voltage formed at the second node may be the same as a voltage formed at the first node.

When the amplifier 370 is disposed in order to remove differences between voltages formed in the terminals of the transistors in the current mirror circuit, the offset voltage compensation circuit 380 may also be disposed so as to elaborately remove the offset voltage V_os of the amplifier 370 by changing the connection of the circuits according to a signal from an external circuit.

The offset voltage V_os of the amplifier 370 may cause the decrease of the accuracy of the current mirroring of the current mirror circuit. However, periodical switching operations of the sixth to the eighth transistors 381, 382, 383 may allow removing the offset voltage V_os so that a current to be supplied to a pixel may be precisely controlled.

The time period regarding FIG. 6 and FIG. 7 may be a time period between a beginning time point and an ending time point defined by a method described below, during which a charge and a discharge of the offset voltage compensation capacitor 385 of the current supply circuit are performed.

For example, the time period may be a time period during which operations of circuits inside the current supply circuit 300, for example, the sixth transistor 381, the seventh transistor 382, the eighth transistor 383, etc., are controlled and maintained.

Referring to the operations of the circuits inside the current supply circuit 300, for example, the sixth transistor 381, the seventh transistor 382, the eighth transistor 383, etc., switches may be turned on/off at specific time points corresponding to a rising edge timing or a falling edge timing of a pulse and the switches may be maintained in a state of on or off during the first time period or the second time period.

Figure 8:
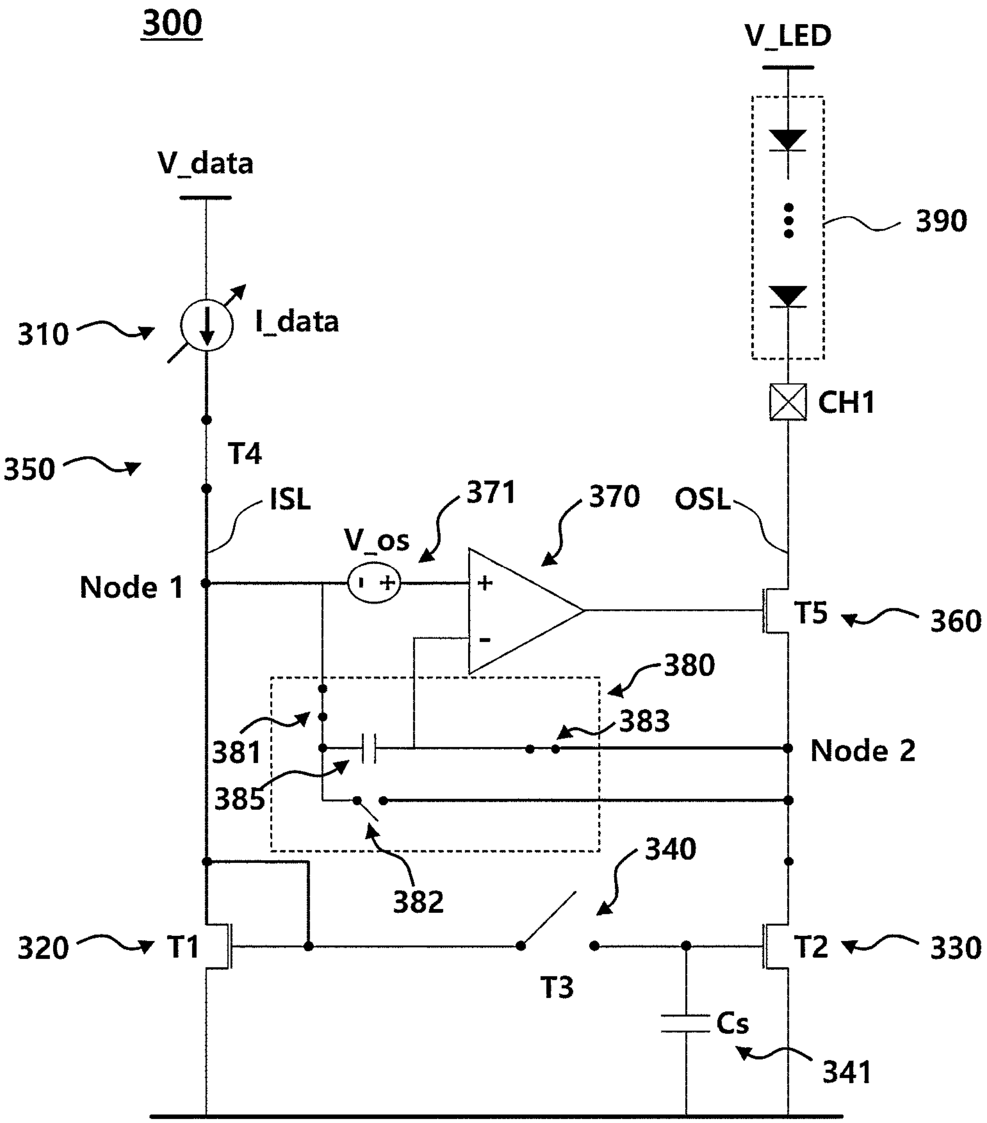
FIG. 8 is a second exemplary diagram illustrating a switching operation of the current supply circuit in accordance with the embodiment of the present disclosure during a first time period.

FIG. 8 is a second exemplary diagram illustrating a switching operation of the current supply circuit in accordance with the embodiment of the present disclosure during a first time period.

Figure 9:
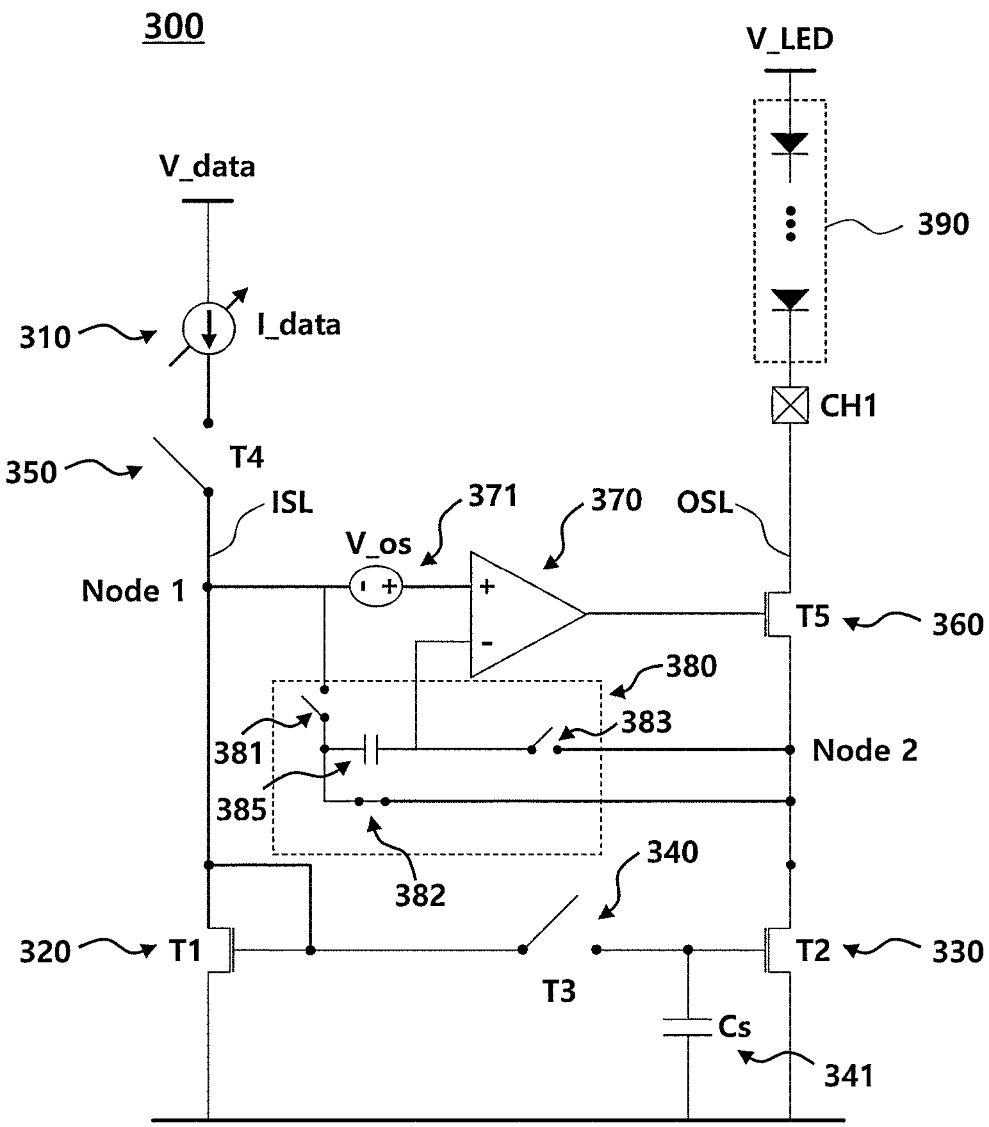
FIG. 9 is a second exemplary diagram illustrating a switching operation of the current supply circuit in accordance with the embodiment of the present disclosure during a second time period.

FIG. 9 is a second exemplary diagram illustrating a switching operation of the current supply circuit in accordance with the embodiment of the present disclosure during a second time period.

The current supply circuit 300 may be supplied with an input current or an input voltage through an input signal line ISL, and may supply an output current or an output voltage through an output signal line OSL.

The input signal line ISL may be a signal line which transfers an input current from the data driving circuit to the first transistor 320 or the amplifier 370 and the output signal line OSL may be a signal line which transfers an output current from the second transistor 330 or the fifth transistor 360.

The current supply circuit 300 may generate an output current by mirroring an input current through a pair of transistors 320, 330 and an element of the current supply circuit 300, which performs a current mirroring, may be defined as a current mirror circuit (not shown). For example, the current mirror circuit (not shown) may be a circuit including the first transistor 320 and the second transistor 330 described above.

The voltage compensation circuit 375 may be disposed between the input signal line ISL and the output signal line OSL, and may be a circuit which compensates for the voltage difference between the input signal line ISL and the output signal line OSL.

The voltage compensation circuit 375 may feed back a voltage, formed at the second node, to the amplifier 370, or may selectively transfer or receive the same voltage as the second node.

The amplifier 370 may be a comparator circuit which compares voltages of the input terminals and outputs an output, but is not limited thereto.

The second transistor 330 or the fifth transistor 360 may be connected to the output terminal of the amplifier 370, may receive a gate voltage from the output terminal, and may supply a current to the light emitting diode 390.

The offset voltage compensation circuit 380 may include the sixth transistor 381 which is connected to the first input terminal, for example, a positive terminal or a negative terminal, of the amplifier 370 and selectively receives the input current from the input signal line ISL.

The offset voltage compensation circuit 380 may include the seventh transistor 382 which selectively receives the output current of the sixth transistor 381 and transfers the output current to the drain terminal of the second transistor 330.

The offset voltage compensation circuit 380 may include the eighth transistor 383 which is connected to the second input terminal, for example, a negative terminal or a positive terminal, of the amplifier 370 and selectively controls a current.

During the first time period, the sixth transistor 381 and the eighth transistor 383 may be turned on at the same timing, and the seventh transistor 382 may be turned off. In this case, a voltage the same as the voltage of the first node may be transferred to the one terminal of the offset voltage compensation capacitor 385, and a voltage larger than the voltage by the offset voltage V_os may be formed at the second node to be transferred to the other terminal of the offset voltage compensation capacitor 385. The first time period may be defined as a charging period during which the offset voltage compensation capacitor 385 stores a voltage having the same level as that of the offset voltage.

During the second time period, the sixth transistor 381 and the eighth transistor 383 may be turned off at the same timing, and the seventh transistor 382 may be turned on. In this case, the voltage of the first node may not be directly transferred to the one terminal of the offset voltage compensation capacitor 385, and the voltage of the second node may be directly transferred to the one terminal of the offset voltage compensation capacitor 385. Since the other terminal of the offset voltage compensation capacitor 385 is connected to the second input terminal of the amplifier 370, the first node and the second node may have the voltage at the same level by an offset effect of the offset voltage V_os and an opposite voltage having the same level as that of the offset voltage V_os, for example, a voltage formed in the offset voltage compensation capacitor 385.

The offset voltage compensation capacitor 385 may be a circuit which stores a difference between voltages formed in the first input terminal and the second input terminal, for example, an offset voltage.

In the current supply circuit 300, the third transistor 340 and the fourth transistor 350 may interconnect with each other to operate during the first time period and the second time period described above.

In the current supply circuit 300, the third transistor 340 or the fourth transistor may independently operate during the first time period and the second time period. As necessary, the fourth transistor 350 may be omitted or replaced with another circuit.

In order to set a voltage in the first node while the fourth transistor 350 is turned off, a group of circuits may be added.

During the first time period, the third transistor 340 and the fourth transistor 350 may be turned on. During the second time period, the third transistor 340 and the fourth transistor 350 may be turned of.

The whole or a part of the respective transistors 340, 350, 381, 382 and 383 in the current supply circuit 300 interconnectedly operate and this leads to the power consumption of the circuits inside the current supply circuit 300 being reduced and a difference between the input signal line ISL and the output signal line OSL is reduced and this leads to a difference in a current supplied to a pixel being reduced.

The third, fourth, sixth, seventh and eighth transistors 340, 350, 381, 382 and 383 may individually operate, but the operations of the respective transistors 340, 350, 381, 382 and 383 may be controlled at the same timing.

Since the operations of the third, fourth, sixth, seventh and eighth transistors 340, 350, 381, 382 and 383 are simultaneously controlled, the second transistor 330 or the fifth transistor 360 may stably supply a current or a voltage to the light emitting diode 390 of the pixel, and thus, the image quality may be prevented from being deteriorated.

Figure 10:
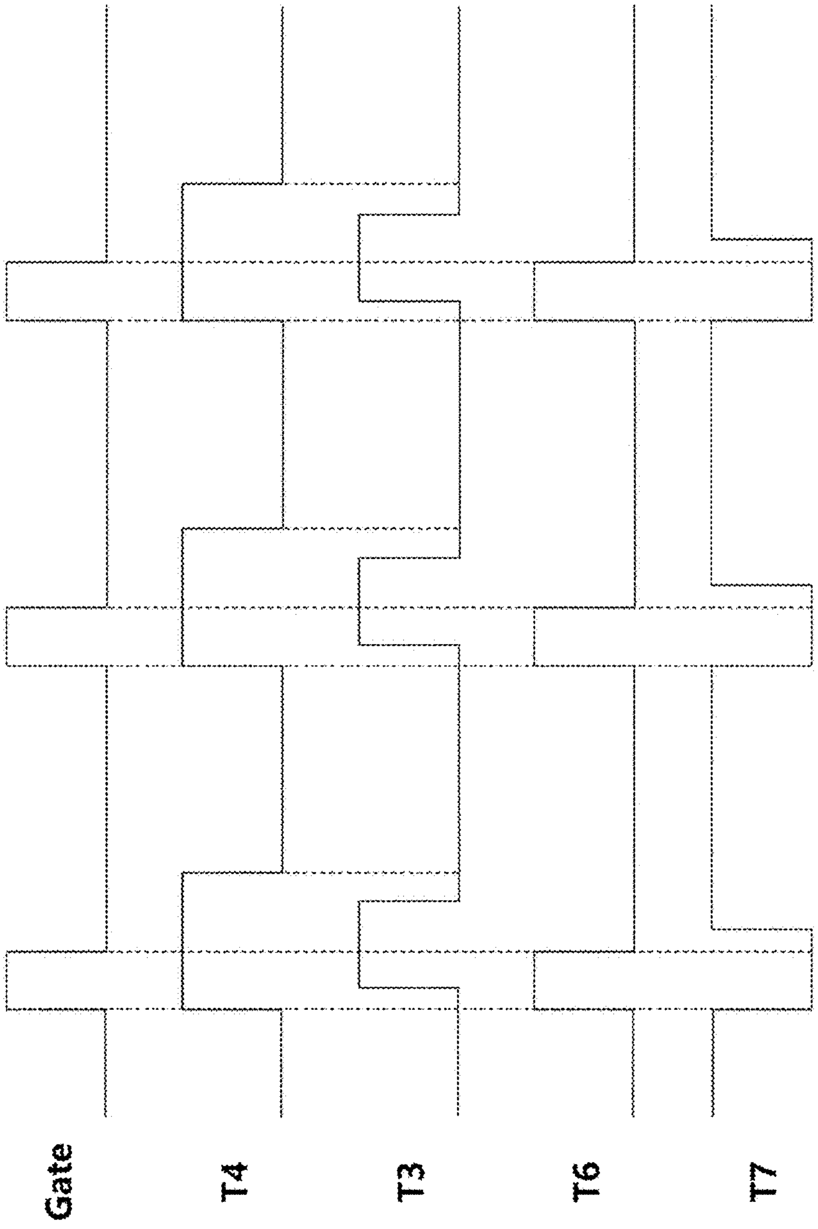
FIG. 10 is a timing diagram of signals supplied to transistors in the current supply circuit in accordance with the embodiment of the present disclosure.

FIG. 10 is a timing diagram of signals supplied to transistors in the current supply circuit in accordance with the embodiment of the present disclosure.

Referring to FIG. 10, a timing diagram 1000 of a method for driving the transistors of the current supply circuit illustrated in FIGS. 5 to 9 described above may be illustrated.

A driving start timing of a scan signal Gate, for example, a start timing of a rising edge of one clock, transferred from the gate driving circuit (not shown) of the panel and the driving start timing of the fourth transistor 350 may be the same. A start timing of a turn-on signal of the gate driving circuit may define a timing of supplying a data voltage or a data current, and a driving timing of the fourth transistor 350 may be determined in accordance with the timing of supplying the data voltage or the data current.

Since the third transistor 340 is disposed between the first transistor 320 and the second transistor 330 of the current mirror circuit, the third transistor 340 may start to be driven at a timing later than a timing where signals are supplied to the fourth, sixth, seventh and eighth transistors 350, 381, 382, 383.

The third transistor 340 being driven a predetermined time after the operations of the fourth, sixth, seventh and eighth transistors 350, 381, 382, 383 allows the adjustment of a current between the first transistor 320 and the second transistor 330.

The driving start timing of the sixth transistor 381 may be the same as the driving start timing of the fourth transistor 350. Since the sixth transistor 381 and the eighth transistor 383 may be turned on at the same timing and the seventh transistor 382 may be turned off, a signal having an opposite phase may be generated at the same driving start timing in the seventh transistor 382.

Through the above-described method, an error of the current mirror may be minimized through the change and combination of the operations of the transistors during the first time period and the second time period without generation of a separate signal to remove the offset voltage of the amplifier 370 of the current compensation circuit 375, and it is possible to prevent deterioration of image characteristics, such as a performance of a backlight or the image quality of the panel.

Figure 11:
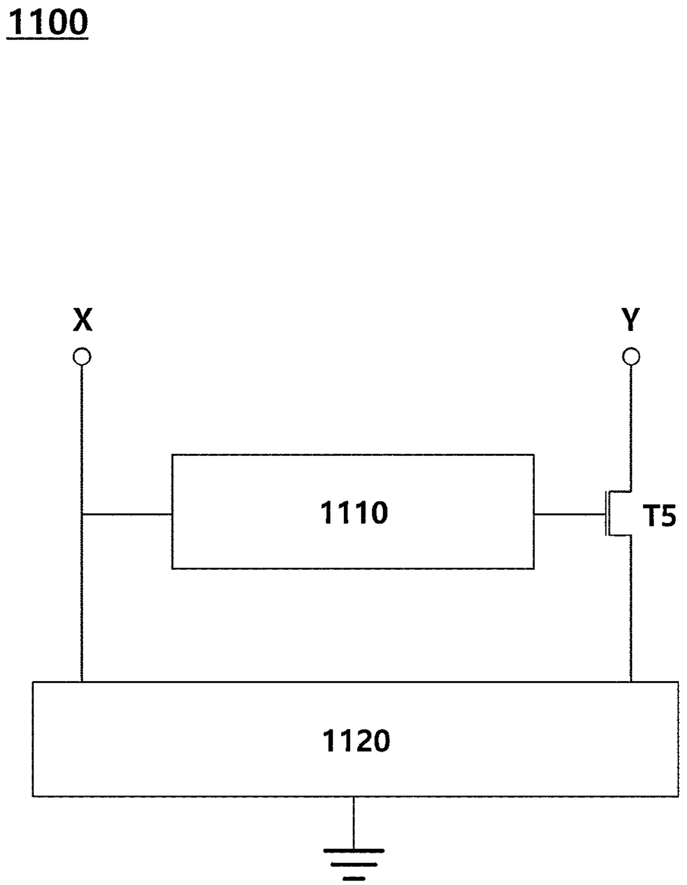
FIG. 11 is a third exemplary diagram illustrating a current supply circuit in accordance with an embodiment of the present disclosure.

FIG. 11 is a third exemplary diagram illustrating a current supply circuit in accordance with an embodiment of the present disclosure.

Figure 12:
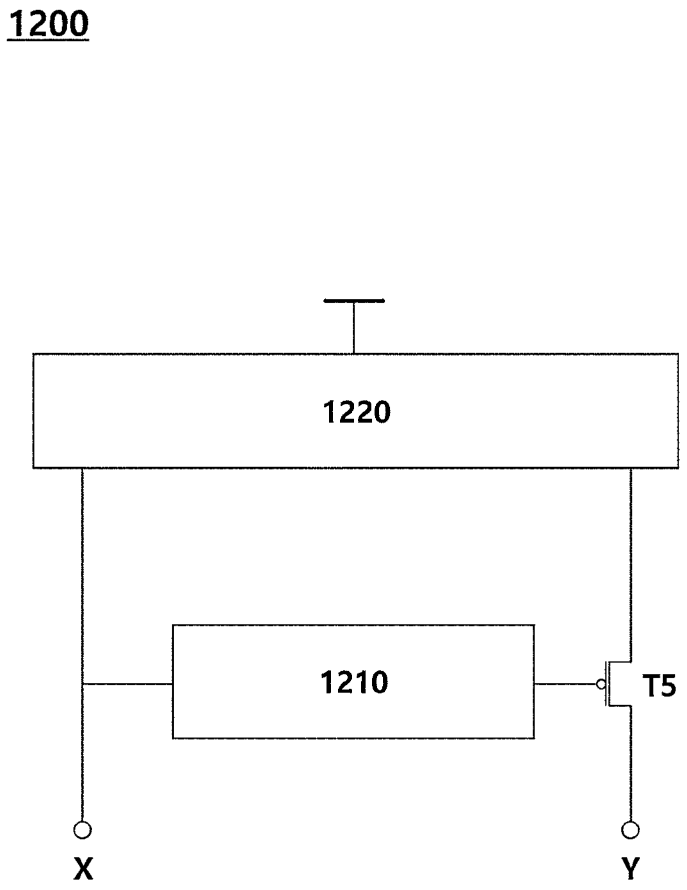
FIG. 12 is a fourth exemplary diagram illustrating a current supply circuit in accordance with an embodiment of the present disclosure.

FIG. 12 is a fourth exemplary diagram illustrating a current supply circuit in accordance with an embodiment of the present disclosure.

The current supply circuits shown in FIG. 11 and FIG. 12 may current supply circuits according to various embodiments of the present disclosure.

A current supply circuit 1100, 1200 may comprise a voltage compensation circuit 1110, 1210, a current mirror circuit 1120, 1220 and a transistor T5.

The voltage compensation circuit 1110, 1210 may be the voltage compensation circuit shown in FIG. 5 to FIG. 9 or a circuit to compensate for a difference between voltages of an X terminal and one terminal, for example, a gate terminal, a source terminal or a drain terminal, of the transistor T5.

The current mirror circuit 1120, 1220 may be the current mirror circuit shown in FIG. 5 to FIG. 9. However, the technical idea of the present disclosure is not limited thereto, but various types of general current mirror circuits to mirror an input current/voltage and to output it may be adopted. For example, the current mirror circuit 1120, 1220 may be a Cascode current mirror circuit.

The position of the current mirror circuit 1120, 1220 is not limited to the position described above, but the current mirror circuit 1120, 1220 may be disposed in various positions which allow the achievement of the purpose of sinking or sourcing currents.

Each of the voltage compensation circuit 1110, 1210 and the current mirror circuit 1120, 1220 may be connected with one terminal, for example, a source terminal, a drain terminal or a gate terminal of the transistor T5. Here, the transistor T5 may comprise an N-MOS or P-MOS transistor and receive or output a current depending on the type of light emitting element, the disposition of circuits, etc.

As the transistor T5, various types of transistors may be adopted and an N-MOS transistor may be connected with the voltage compensation circuit 1110 and the current mirror circuit 1120 as shown in FIG. 11, but the technical idea of the present disclosure is not limited thereto. In addition, as the transistor T5, a P-MOS transistor may be connected with the voltage compensation circuit 1210 and the current mirror circuit 1220 as shown I FIG. 12, but the technical idea of the present disclosure is not limited thereto, either.

In addition to the foregoing, the technical idea of the present disclosure may include various embodiments as long as they are to achieve a technical purpose of compensating for a difference between voltages of nodes, for example, an X node and a Y node by sharing a transistor or keeping the difference between the nodes within a predetermined range.

What is claimed is:

1. A current mirror circuit comprising:

a first transistor configured to be supplied with a data current from a data driving circuit;

a second transistor configured to drive a light emitting diode by mirroring the data current transferred to the first transistor; and a voltage compensation circuit disposed between one terminal of the first transistor and one terminal of the second transistor and configured to compensate for a difference between a voltage of the one terminal of the first transistor and a voltage of the one terminal of the second transistor, wherein the voltage compensation circuit comprises:

an amplifier configured to receive, through a first input terminal, a voltage that is same as the voltage of the one terminal of the first transistor; and an offset voltage compensation circuit connected to a second input terminal of the amplifier and being configured to compensate for an offset voltage of the amplifier.

2. The current mirror circuit according to claim 1, further comprising:

a third transistor disposed between the first transistor and the second transistor and configured to adjust an input current of a gate terminal of the second transistor; and a fourth transistor configured to adjust the data current transferred to the one terminal of the first transistor.

3. The current mirror circuit according to claim 2, wherein the third transistor is connected to a gate terminal of the first transistor and the gate terminal of the second transistor, and is configured to selectively cut off a current transferred to the second transistor.

4. The current mirror circuit according to claim 1, further comprising:

a capacitor disposed between the first transistor and the second transistor and configured to store a voltage of a gate terminal of the second transistor, wherein a same voltage is supplied to another terminal of the first transistor, another terminal of the second transistor and one terminal of the capacitor.

5. The current mirror circuit according to claim 2, wherein the offset voltage compensation circuit comprises:

a fifth transistor configured to receive an input signal through a first node connected to the one terminal of the first transistor;

an offset voltage compensation capacitor connected to an output terminal of the fifth transistor and the second input terminal of the amplifier;

a sixth transistor connected to a common node which is formed of the output terminal of the fifth transistor and one terminal of the offset voltage compensation capacitor and connected to the one terminal of the second transistor; and a seventh transistor connected to a common node which is formed of another terminal of the offset voltage compensation capacitor and the second input terminal of the amplifier and connected to the one terminal of the second transistor.

6. The current mirror circuit according to claim 5, wherein the fifth transistor and the seventh transistor are turned on or off at a same timing, and the sixth transistor is turned off or on in accordance with operations of the fifth transistor and the seventh transistor.

7. The current mirror circuit according to claim 6, wherein the fifth transistor and the seventh transistor are turned on or off at a timing before an operation of the third transistor.

8. A current supply circuit comprising:

a current mirror circuit configured to generate an output current by mirroring an input current through a pair of transistors; and a voltage compensation circuit configured to compensate for a voltage difference between an input signal line through which the input current is transferred and an output signal line through which the output current is transferred, wherein the voltage compensation circuit comprises:

an amplifier disposed between the input signal line and the output signal line and configured to feed a voltage of the output signal line back; and an offset voltage compensation circuit connected to an input terminal of the amplifier and being configured to compensate for an offset voltage of the amplifier.

9. The current supply circuit according to claim 8, wherein the current mirror circuit and the voltage compensation circuit are connected with a transistor to receive or to output a current, and wherein the transistor comprises an N-MOS transistor or a P-MOS transistor.

10. The current supply circuit according to claim 8, further comprising:

a fifth transistor connected to the output terminal of the amplifier and configured to be supplied with a gate voltage from the output terminal and to supply a current to a light emitting diode.

11. The current supply circuit according to claim 10, wherein the offset voltage compensation circuit comprises:

a sixth transistor connected to a first input terminal of the amplifier and configured to selectively receive the input current from the input signal line;

a seventh transistor configured to selectively receive an output current of the sixth transistor and to transfer the output current to a terminal of the second transistor; and an eighth transistor connected to a second input terminal of the amplifier and configured to selectively control a current.

12. The current supply circuit according to claim 11, wherein an operation start timing of the sixth transistor is the same as an operation start timing of the fourth transistor, and operations of the third transistor and the sixth to eighth transistors are controlled at a same timing.

13. The current supply circuit according to claim 12, wherein operation timings of the sixth to eighth transistors correspond to an operation timing of the fourth transistor which is connected to one end of the first transistor.

14. A current supply circuit comprising:

a first transistor configured to be selectively supplied with a data driving current through a data line by using a data current cutoff switch;

a second transistor configured to supply to a light emitting diode a current having a level corresponding to that of the data driving current transferred to the first transistor;

a third transistor connected to gate terminals of the first transistor and the second transistor and configured to electrically disconnect the first transistor and the second transistor from each other by cutting off a current supply when the data current cutoff switch is turned off; and a voltage compensation circuit connected to one end of the first transistor and one end of the second transistor and configured to compensate for a voltage of a gate terminal of the second transistor, wherein an operation of the voltage compensation circuit is changed in accordance with an operation timing of the data current cutoff switch, and wherein the voltage compensation circuit comprises:

an amplifier disposed between the first transistor and the second transistor and configured to compare voltages of input terminals and to output an output voltage; and an offset voltage compensation circuit configured to change connections of circuits in accordance with the operation timing of the data current cutoff switch and to remove an offset voltage of the amplifier.

15. The current supply circuit according to claim 14, wherein the offset voltage compensation circuit comprises:

an offset voltage compensation capacitor configured to store a voltage having the same magnitude as an offset voltage at a first input terminal of the amplifier and be connected between the first input terminal and a second input terminal of the amplifier; and a plurality of transistors connected to the offset voltage compensation capacitor and configured to maintain a voltage of the offset voltage compensation capacitor by being turned on or off in accordance with the operation timing of the data current cutoff switch.

* * * * *